T. T. GRASER.
PUMP.
APPLICATION FILED MAY 2, 1908.

910,125.

Patented Jan. 19, 1909.

Witnesses
Geo. Ackman Jr.
P. M. Smith.

Inventor
Thomas T. Graser,
By Victor J. Evans,
Attorney.

UNITED STATES PATENT OFFICE.

THOMAS T. GRASER, OF ROCHESTER, NEW YORK.

PUMP.

No. 910,125.  Specification of Letters Patent.  Patented Jan. 19, 1909.

Application filed May 2, 1908. Serial No. 430,540.

*To all whom it may concern:*

Be it known that I, THOMAS T. GRASER, a citizen of the United States, residing at Rochester, in the county of Monroe and State of New York, have invented new and useful Improvements in Pumps, of which the following is a specification.

This invention relates to pumps, the object of the invention being to provide a simple, inexpensive and effective pump, which in the preferred embodiment of the invention is of the rotary type and contemplates the use in connection with a water conduit embodying a flexible wall, a movable pressure element which coöperates with the flexible wall of the conduit so as to cause the latter to suck in and discharge charges of water thereby giving an uninterrupted movement to the pump and effecting an almost continuous flow of water.

With the above general object in view, the nature of which will more fully appear as the description proceeds, the invention consists in the novel construction, combination and arrangement of parts as herein fully described, illustrated and claimed.

Figure 1:
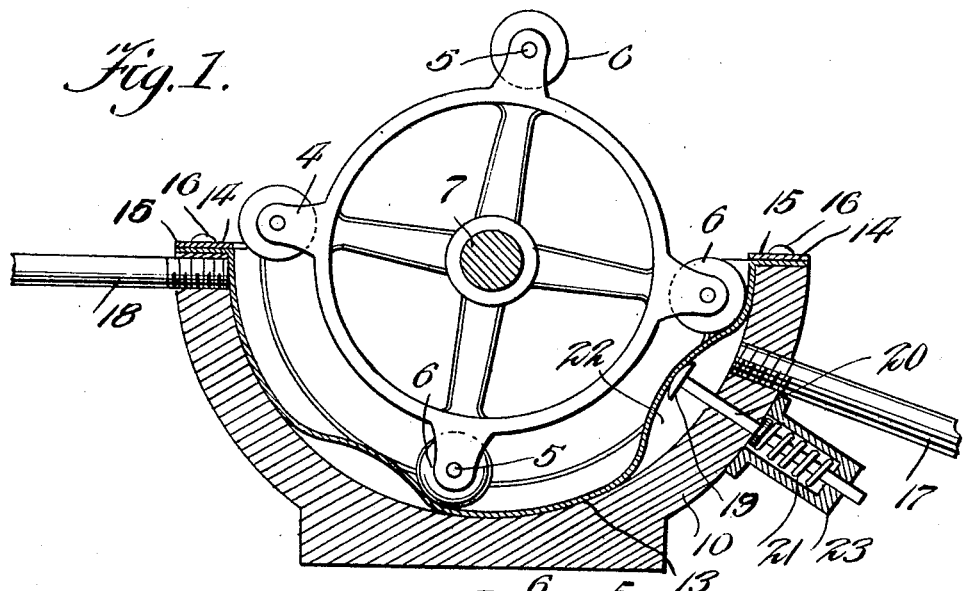
Figure 2:
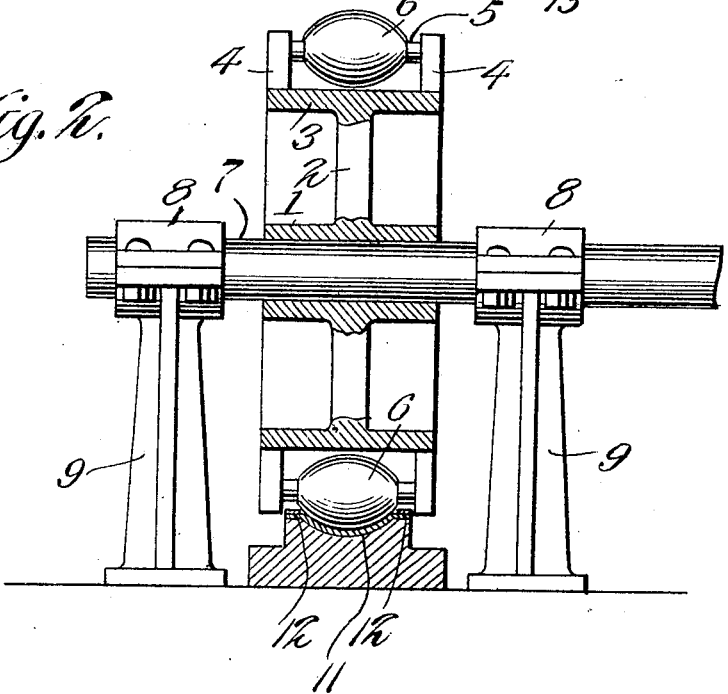

In the accompanying drawings:—Figure 1 is a vertical sectional view of a pump embodying the present invention. Fig. 2 is a vertical transverse section through the same taken at right angles to Fig. 1.

The movable element of the pump is in the form of a wheel or pulley comprising a hub 1, spokes or web 2 and rim 3, the latter being provided at suitable intervals with outwardly extending lugs 4 provided with bearings for the spindles 5 of a series of rollers or pressure elements 6 which are adapted to revolve freely and work in contact with the flexible wall of the conduit hereinafter described. The rotary element is mounted fast on a power shaft 7, the latter being shown as journaled in bearings 8 carried by pedestals 9 secured to the floor or a suitable base.

10 designates a water conduit which as shown in Fig. 1 is substantially semi-circular, although said conduit may be greater or less than a semi-circle as may be found expedient in practice. The shape of said conduit in cross section is illustrated in Fig. 2 wherein it will be seen that it is formed with a concave channel or gutter which constitutes the inflexible or immovable wall 11 of the conduit. At opposite sides of the channel or gutter formed by the wall 11, the conduit is provided with flat faces 12 to which is secured the opposite sides or edges of a flexible strip 13 of any suitable material such as canvas, leather, rubber or the like, the said strip forming the flexible wall of the water conduit. In addition to securing the opposite side edges of the strip to the fixed body of the conduit, the ends 14 of said strip are secured to the corresponding ends of the fixed portion of the conduit as shown in Fig. 1 where such ends are clamped by plates or washers 15 held in place by bolts or other suitable fasteners 16. In like manner the opposite side edges of said strip are adapted to be held in place by metal clamping strips secured to the stationary portion of the conduit by suitable fasteners, the entire marginal edge of the strip being thus securely clamped in place so as to form an air-tight joint. By reference to Fig. 2 it will be noted that the rollers or pressure elements 6 conform in shape to the curvature of the wall 11 of the conduit so as to press the flexible wall or strip 13 into close engagement with such inflexible wall during the operation of the pressure elements.

17 designates the intake pipe which leads into the conduit above described near one end thereof, while 18 designates the outflow pipe which communicates with the opposite end of said conduit and is preferably arranged immediately adjacent to the extreme end of the conduit while the intake pipe communicates with the conduit at a short distance from the end thereof. Arranged adjacent to the intake pipe is an expander comprising a head 19, the stem 20 which works through an aperture in the wall of the conduit and the spring 21 the tension of which is exerted to force the expander inward as shown in Fig. 1 so as to move the flexible wall 13 away from the inflexible wall of the conduit thereby forming a suction chamber 22 which draws water into the conduit through the intake pipe 17.

23 designates a cap or housing for the spring 21 and also a guide for the stem 20.

In the operation of the pump, rotary motion is imparted to the power shaft 7 which causes the rotation of the head carrying the pressure elements 6, the latter being thereby caused to move in rolling contact with the flexible wall of the conduit. The expander first acts to deflect the flexible wall of the conduit inward as shown in Fig. 1 thereby drawing a charge of water into the initial end of the conduit through the intake pipe 17. As the adjacent roller or pressure element 6 moves along the flexible wall, it forces said flexible wall across the inner end of the intake pipe, thereby closing such orifice and then proceeding further, it presses the expander outward and passes on by the expander, forcing the water in the conduit toward the discharge end thereof until the outflow pipe 18 is reached when the water is ejected through said pipe. The rotary head operates continuously, the pressure elements or rollers following each other in rapid succession and forcing the charges onward through the conduit to the outflow pipe while the expander acts automatically in rear of each pressure element to expand the conduit and cause a suction of water into the conduit through the intake pipe. When the flexible wall or strip 13 becomes worn and unfit for further use, it is an easy matter to remove the same and apply a new flexible wall or strip thus making the pump equal to new.

I claim:—

1. A pump comprising a water conduit embodying a fixed wall and a flexible and movable wall, water intake and outflow connections for said conduit, an expander for deflecting the flexible wall of the conduit to form a suction chamber, and a movable pressure element coöperating with the flexible wall of the conduit to press the same against the fixed wall and cause the movement of the water along the conduit to the point of discharge.

2. A pump comprising a water conduit embodying a fixed wall and a flexible and movable wall, water intake and outflow connections for said conduit, an expander operating adjacent to the intake connection to press the flexible wall away from the fixed wall to form a suction chamber, and a movable pressure element working in contact with the flexible wall, and operating to press the flexible wall against the fixed wall to advance the water along the conduit to the point of discharge.

3. A pump comprising a water conduit embodying a fixed wall and a flexible and movable wall, water intake and outflow connections for said conduit, an expander operating on the flexible wall to form a suction chamber adjacent to the intake connection, and a rotary head carrying pressure elements which roll in contact with the flexible wall of the conduit to press said flexible wall against the fixed wall and thereby cut off the inflow of water to the conduit, press the expander out of the way, and advance the water in the conduit to the point of discharge.

4. A pump comprising a rotary head, a series of rollers carried by said head and moving in a circular path, a segmental water conduit embodying a fixed concave wall, a flexible wall adapted to conform to the curvature of the fixed wall and to be pressed against the same by said roller, intake and outflow connections in communication with said conduit, and an expander operating to press the flexible wall away from the fixed wall of the conduit to form a suction water chamber, substantially as described.

In testimony whereof I affix my signature in presence of two witnesses.

THOMAS T. GRASER.

Witnesses:
REXFORD M. SMITH,
JOHN L. FLETCHER.